June 2, 1925.
J. M. CAVITCH
1,540,599
HEADLIGHT FOR MOTOR VEHICLES
Filed April 23, 1923   2 Sheets-Sheet 1
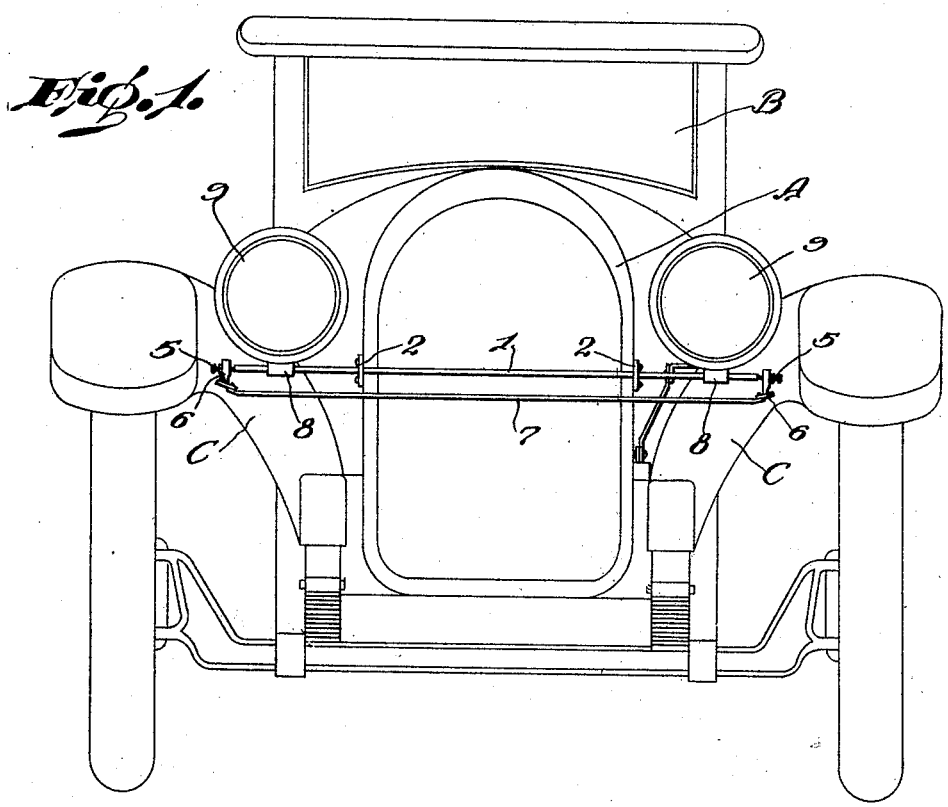
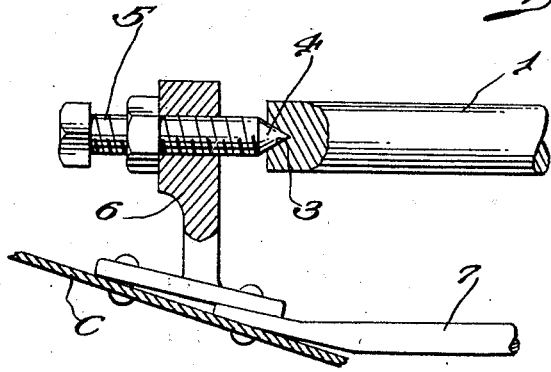

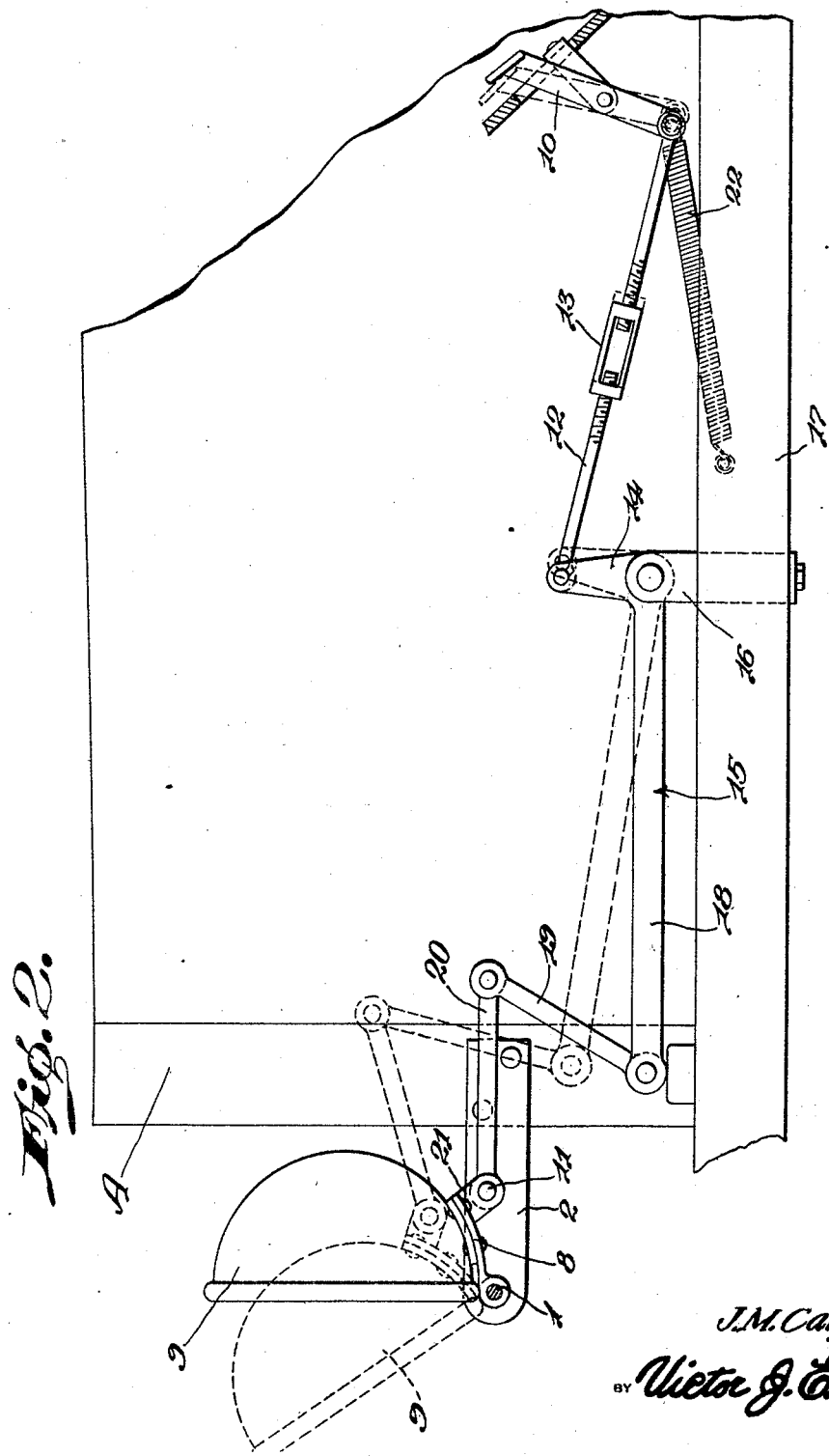

Patented June 2, 1925.

1,540,599

UNITED STATES PATENT OFFICE.

JOHN M. CAVITCH, OF MUNISING, MICHIGAN.

HEADLIGHT FOR MOTOR VEHICLES.

Application filed April 23, 1923. Serial No. 634,137.

*To all whom it may concern:*

Be it known that I, JOHN M. CAVITCH, a citizen of the United States, residing at Munising, in the county of Alger and State of Michigan, have invented new and useful Improvements in Headlights for Motor Vehicles, of which the following is a specification.

This invention relates to headlight structures for motor vehicles, and an object of the invention is to provide a foot controlled headlight structure for motor vehicles by means of which the headlights may be adjusted to prevent the glare in the eyes of an approaching motorist, and one in which the driver does not need to release one hand from the steering wheel to switch or change the lights, the said lights being controlled through the medium of a foot pedal.

Another object of this invention is to provide a headlight structure as specified in which the headlights are mounted for movement on a horizontal axis transversely of the vehicle equipped with the device so that when approaching a pedestrian or other vehicle the operator may by depression of the foot pedal tilt the headlights so that the full rays from the headlights will be on the road directly in front of the wheels of the vehicle thereby giving the driver full vision of the road directly in front of his wheels and enabling him to properly direct the car and also enabling him to have full control of the car as he can use both hands on the steering wheel.

When the headlights are tilted forward in this manner, the approaching driver is not blinded by the glare of the lights and he is aided in the meeting of the approaching vehicle, in that the road in front of the approaching vehicle equipped with the improved headlights is entirely clear and visible to him and enables him to determine just how much room he has to pass the approaching vehicle thereby increasing the safety for both vehicles and eliminating the liability of collision or accident when passing.

Other objects of the invention will appear in the following detailed description taken in connection with the accompanying drawings wherein:—

Fig. 1 is a front elevation of a motor vehicle equipped with the improved headlight structure.

Fig. 2 is a side elevation of the headlight structure.

Fig. 3 is an enlarged detail partly in section showing the manner of mounting the headlight carrying rod.

Referring more particularly to the drawings, the improved headlight structure comprises a rod 1 which extends transversely across the front of the motor vehicle, and is rotatably supported by suitable plates 2, carried by the radiator A of the motor vehicle B. The ends of the rod 1 are provided with substantially conical shaped recesses 3 into which the pointed ends 4 of the bearing bolts 5, engage for providing adjustable thrust bearings for the ends of the rod 1. The bolts 5 are adjustably carried by suitable supporting brackets 6 which are in turn attached to the fenders C of the motor vehicle and to a cross bracing rod 7.

The rod 1 has lamp supporting brackets 8 carried thereby which supports the headlights 9 and the rod is mounted for rocking movement in its bearings to permit forward tilting of the headlights 9, as shown in dotted lines in Fig. 2 of the drawings. The headlights 9 are tilted forwardly by a foot pedal 10 which is connected, by means of an articulated connection with one of the brackets 8 as shown at 11.

The articulated connection between the foot pedal 10 and bracket 8 comprises a rod 12 which is adjustable as to length by means of a turn buckle 13 incorporated therein. The rod 12 is connected to the short end 14 of a bell crank 15, which bell crank is pivotally supported by a suitable bracket 16 attached to the frame or chassis 17 of the motor vehicle B. The long arm 18 of the bell crank 15 extends forwardly and is connected through the medium of links 19 and 20 to the ear 21 on the bracket 8. In certain types of vehicles it may be desirable to eliminate the link 20 and embody only the link 19 and it is to be understood that this construction may be resorted to without departing from the spirit of this invention, the said feature being accomplished by connecting the link 19 to the bracket 21 when the position of the headlights is such as to permit this connection without impairing the operation of the device.

A spring 22 is connected to the lower end of the foot pedal 10 and the chassis 17 and it is tensioned to move the various levers and links to position the headlights 9 in their normal vertical positions upon release of pressure from the foot pedal 10.

In operation, when a motorist whose vehicle is equipped with the improved headlight device just described, approaches a second motorist or motor vehicle he presses forwardly on the foot pedal 10 moving it into the dotted line position shown in Fig. 2. The forward movement of the upper end of the pedal 10 tensions the spring 22 and rocks the bell crank 15 which in turn rocks the rod 1 and tilts the headlights 9 forwardly and downwardly so that the light rays from the headlights will be direct on the road directly in front of the vehicle and will not shine in the eyes of the approaching motorist which will enable both motorists to clearly see the road and thus avoid accidents in passing.

It is, of course, to be understood that the invention may be constructed in other manners and the parts associated in different relations and, therefore, I do not desire to be limited in any manner except as set forth in the claims hereunto appended.

Having thus described my invention what I claim is:—

1. An adjusting mechanism for vehicle headlights, comprising a rod extending transversely across the front of the vehicle, having conical shaped recesses in its ends, a brace rod arranged parallel with the first rod and having its ends secured to the fenders of the vehicle, brackets supported by the fenders at each end of the first rod, adjustable bolts carried by the brackets, pointed ends on said bolts for engagement in the recesses of said first rod, a foot pedal and adjustable connection between the foot pedal and the first rod for imparting movement thereto.

2. An adjusting mechanism for vehicle headlights, comprising a rod extending transversely across the front of the vehicle, having conical shaped recesses in its ends, a brace rod arranged parallel with the said first rod, having its ends connected to the fenders of the vehicle, brackets supported by the fenders at each end of the brace rod and first rod, movable bolts carried by the brackets, pointed ends on the inner ends of said bolts engaging in the recesses in the first rod to support the same for rotative movement, a foot pedal and adjustable rod connected to the foot pedal and link connection between the adjustable rod and the first rod, whereby movement of the foot pedal will impart rotative movement to said first rod.

In testimony whereof I affix my signature.

JOHN M. CAVITCH.